United States Patent
Sung

(10) Patent No.: US 10,681,751 B2
(45) Date of Patent: Jun. 9, 2020

(54) OPERATION METHOD OF COMMUNICATION NODE IN COMMUNICATION NETWORK

(71) Applicant: Electronics and Telecommunications Research Institute, Daejeon (KR)

(72) Inventor: Nak Woon Sung, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 9 days.

(21) Appl. No.: 15/919,910

(22) Filed: Mar. 13, 2018

(65) Prior Publication Data

US 2018/0270882 A1    Sep. 20, 2018

(30) Foreign Application Priority Data

Mar. 15, 2017    (KR) .................. 10-2017-0032609

(51) Int. Cl.
*H04W 76/12* (2018.01)
*H04L 29/12* (2006.01)
*H04W 16/32* (2009.01)
*H04W 88/16* (2009.01)

(52) U.S. Cl.
CPC ......... *H04W 76/12* (2018.02); *H04L 61/1511* (2013.01); *H04L 61/2015* (2013.01); *H04L 61/2069* (2013.01); *H04L 61/6054* (2013.01); *H04W 16/32* (2013.01); *H04W 88/16* (2013.01)

(58) Field of Classification Search
None
See application file for complete search history.

(56) References Cited

U.S. PATENT DOCUMENTS

| 6,618,592 | B1 | 9/2003 | Vilander et al. |
| 6,687,252 | B1 | 2/2004 | Bertrand et al. |
| 7,577,725 | B1 | 8/2009 | Sitaraman et al. |
| 7,672,320 | B2 | 3/2010 | Arai |
| 7,986,670 | B2 | 7/2011 | Babbar et al. |
| 9,288,668 | B2 | 3/2016 | Kim et al. |
| 2009/0022100 | A1 | 1/2009 | Fiat |
| 2010/0150049 | A1 | 6/2010 | Kim et al. |

(Continued)

FOREIGN PATENT DOCUMENTS

| KR | 10-1026619 B1 | 4/2011 |
| KR | 10-2013-0015532 A | 2/2013 |

(Continued)

*Primary Examiner* — Christine T Duong
(74) *Attorney, Agent, or Firm* — Rabin & Berdo, P.C.

(57) ABSTRACT

An operation method of a first communication node in a communication system including an evolved packet core (EPC), a plurality of base stations, and a communication network connecting the EPC and the plurality of base stations may comprise transmitting a first message requesting a packet data network (PDN) connection to a second communication node included in the communication network; receiving a second message including an internet protocol (IP) address-related information from the second communication node; and dynamically assigning IP addresses to the plurality of base stations connected to the first communication node based on the IP address-related information.

19 Claims, 5 Drawing Sheets

(56) References Cited

U.S. PATENT DOCUMENTS

| | | | |
|---|---|---|---|
| 2010/0151894 A1* | 6/2010 | Oh | H04W 72/082 |
| | | | 455/509 |
| 2010/0331023 A1* | 12/2010 | Cai | H04L 51/14 |
| | | | 455/466 |
| 2011/0075675 A1* | 3/2011 | Koodli | H04L 12/14 |
| | | | 370/401 |
| 2013/0024553 A1* | 1/2013 | Mittal | H04L 41/0893 |
| | | | 709/222 |
| 2014/0092772 A1 | 4/2014 | Bitar et al. | |
| 2014/0287760 A1* | 9/2014 | Spinelli | H04W 92/02 |
| | | | 455/437 |
| 2016/0050649 A1 | 2/2016 | Park et al. | |
| 2016/0241512 A1 | 8/2016 | Liu et al. | |
| 2017/0026335 A1* | 1/2017 | Dhulipala | H04L 61/2015 |
| 2017/0099685 A1* | 4/2017 | Wallentin | H04W 24/02 |
| 2017/0289095 A1* | 10/2017 | Jalan | G06F 16/9038 |

FOREIGN PATENT DOCUMENTS

| | | |
|---|---|---|
| KR | 10-2016-0009372 A | 1/2016 |
| KR | 10-1587416 B1 | 1/2016 |

\* cited by examiner

OPERATION METHOD OF COMMUNICATION NODE IN COMMUNICATION NETWORK

CROSS-REFERENCE TO RELATED APPLICATIONS

This application claims priority to Korean Patent Application No. 10-2017-0032609 filed on Mar. 15, 2017 in the Korean Intellectual Property Office (KIPO), the entire contents of which are hereby incorporated by reference.

BACKGROUND

1. Technical Field

The present disclosure relates to an operation method of a communication node in a communication network, and more specifically, to an operation method of a communication node for assigning an internet protocol (IP) address to a small base station in a communication network.

2. Related Art

The communication system includes a core network (e.g., a mobility management entity (MME), a serving gateway (SGW), a packet data network (PDW) gateway (PGW), and the like), at least one base station (e.g., a macro base station, a small base station, a relay, and the like), at least one terminal, and the like. The communications between the base station and the terminal may be performed using at least one of various radio access technologies (e.g., 4G communication technologies, 5G communication technologies, wireless local area network (WLAN) technologies, wireless personal area network (WPAN) technologies, etc.).

The base station may be connected to the core network via a wired backhaul or a wireless backhaul. For example, the base station may transmit data, control information, etc. received from the terminal to the core network through the wired backhaul or the wireless backhaul. The base station may also receive data, control information, etc. from the core network via the wired backhaul or the wireless backhaul.

Meanwhile, in case that the backhaul of the communication system is composed of a LTE communication type network, the PGW may assign a single IP address to the small base station supporting a small cell. Accordingly, the small base station may transmit packets based on the IP address assigned from the PGW. That is, the PGW and the small base station may use the single IP address for packet transmissions between the PGW and the small base station.

As described above, when packets between the PGW and the small base station are transmitted based on the single IP address, the PGW and the small base station perform encapsulation or decapsulation procedures on the packets according to the IP address. Therefore, in the communication network including the backhaul based on the LTE communication type network, there is a problem that a load occurs in the PGW and the small base station in the process of transmitting the packets.

SUMMARY

Accordingly, embodiments of the present disclosure provide an operation method of a communication node for assigning an IP address to a small base station, which can reduce loads in a packet transmission procedure in a communication network.

In order to achieve the objective of the present disclosure, an operation method of a first communication node in a communication system including an evolved packet core (EPC), a plurality of base stations, and a communication network connecting the EPC and the plurality of base stations may comprise transmitting a first message requesting a packet data network (PDN) connection to a second communication node included in the communication network; receiving a second message including an internet protocol (IP) address-related information from the second communication node; and dynamically assigning IP addresses to the plurality of base stations connected to the first communication node based on the IP address-related information.

The first communication node may be a terminal included in the communication network, and the second communication node may be a communication node controlling mobility of the communication network.

The first message may include an indicator requesting an international mobile subscriber identity (IMSI) of the first communication node, information on a PDN type, and a domain name system (DNS) server address.

The IP address-related information may include a group identity (GID), a plurality of IP addresses, and a DNS server address for the plurality of base stations connected to the first communication node.

The IP address-related information may be generated in a PDN gateway connected to the second communication node.

The plurality of base station may be small base stations each of which supports a small cell.

The dynamically assigning IP addresses may include receiving a third message for discovering a dynamic host configuration protocol (DHCP) server from a first base station among the plurality of base stations; and transmitting a fourth message including one of a plurality of IP addresses included in the IP address-related information to the first base station.

The dynamically assigning IP addresses may further include receiving a fifth message including an indicator requesting use of the one of a plurality of IP addresses from the first base station; and transmitting a sixth message including an indicator indicating the use of the one of a plurality of IP addresses to the first base station.

In order to achieve the objective of the present disclosure, an operation method of a first communication node in a communication system including an evolved packet core (EPC), a plurality of base stations, and a communication network connecting the EPC and the plurality of base stations may comprise receiving a first message requesting creation of a session from a second communication node included in the communication network; generating an internet protocol (IP) address-related information for the plurality of base stations included in the communication network; transmitting a second message including the IP address-related information to the second communication node; establishing a radio bearer for supporting communications between the first communication node and the plurality of base station; and supporting communications of the plurality of base stations based on the established radio bearer.

The first communication node may be a packet data network (PDN) gateway included in the communication network, the second communication node may be a communication node controlling mobility of the communication network, and the plurality of base station may be small base stations each of which supports a small cell.

The first message may include an indicator requesting an international mobile subscriber identity (IMSI) of a fourth communication node, information on a PDN type, and a domain name system (DNS) server address.

The fourth communication node may be a terminal included in the communication network.

The IP address-related information may include a group identity (GID), a plurality of IP addresses, and a DNS server address for the plurality of base stations.

The radio bearer may be a default evolved packet system (EPS) bearer for supporting communications between the first communication node and the plurality of base stations.

In order to achieve the objective of the present disclosure, a first communication node in a communication system including an evolved packet core (EPC), a plurality of base stations, and a communication network connecting the EPC and the plurality of base stations may comprise a processor and a memory storing at least one instruction executed by the processor. Here, the at least one instruction may be configured to receive a first message requesting a packet data network (PDN) connection from a second communication node included in the communication network; transmit a second message requesting creation of a session to a third communication node included in the communication network; receive a third message including an internet protocol (IP) address-related information for the plurality of base stations included in the communication network; and transmit a fourth message including the IP address-related information to the second communication node.

The first communication node may be a communication node controlling mobility of the communication network, and the second communication node may be a terminal included in the communication network.

The third communication node may be a PDN gateway included in the communication network.

The plurality of base station may be small base stations each of which supports a small cell.

The first message may include an indicator requesting an international mobile subscriber identity (IMSI) of the second communication node, information on a PDN type, and a domain name system (DNS) server address.

The IP address-related information may include a group identity (GID), a plurality of IP addresses, and a DNS server address for the plurality of base stations.

Using the embodiments according to the present disclosure, it is made possible to reduce the time required for encapsulation and decapsulation for the IP address of the packets in the packet transmission process of the communication node in the communication network. Accordingly, the operation methods according to the present disclosure have the effect of saving resources by efficiently using wireless or wired resources used in the communication network.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
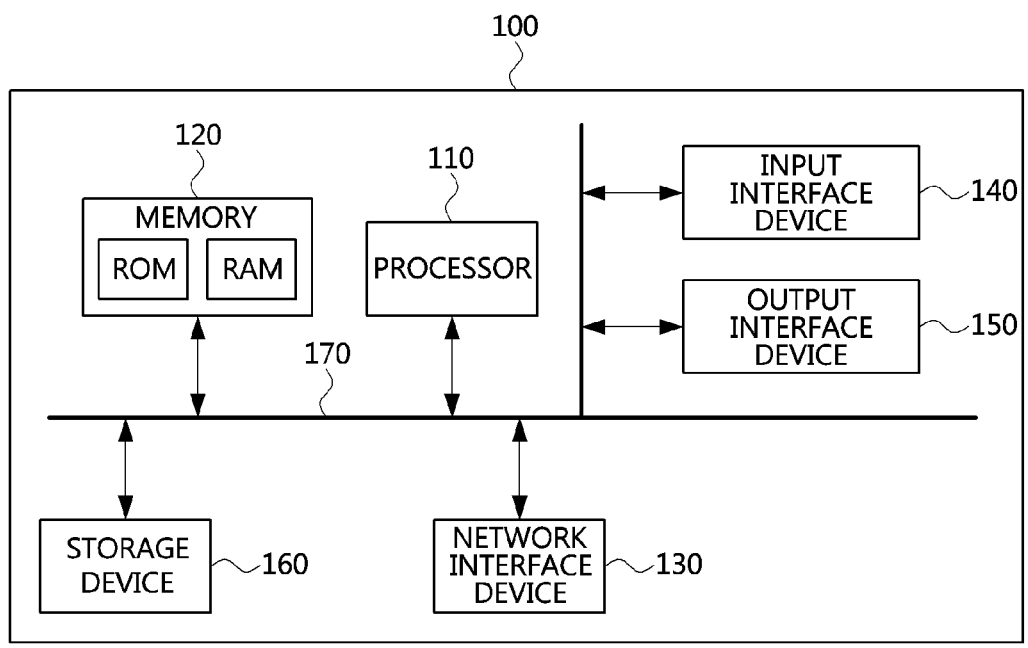
FIG. 1 is a block diagram illustrating a first communication node performing an operation method in a communication network according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating a first communication node performing an operation method in a communication network according to an embodiment of the present disclosure.

Referring to FIG. 1, a communication node 100 may comprise at least one processor 110, a memory 120, and a transceiver 130 connected to a network for performing communications. Also, the communication node 100 may further comprise an input interface device 140, an output interface device 150, a storage device 160, and the like. Each component included in the communication node 100 may communicate with each other as connected through a bus 170. However, each of the components included in the communication node 100 may be connected to the processor 110 via a separate interface or a separate bus rather than the common bus 170. For example, the processor 110 may be connected to at least one of the memory 120, the transceiver 130, the input interface device 140, the output interface device 150, and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM). Here, the program executed through the processor 110 may include a plurality of steps for performing an operation method of a communication node in a communication network proposed by the present disclosure.

Figure 2:
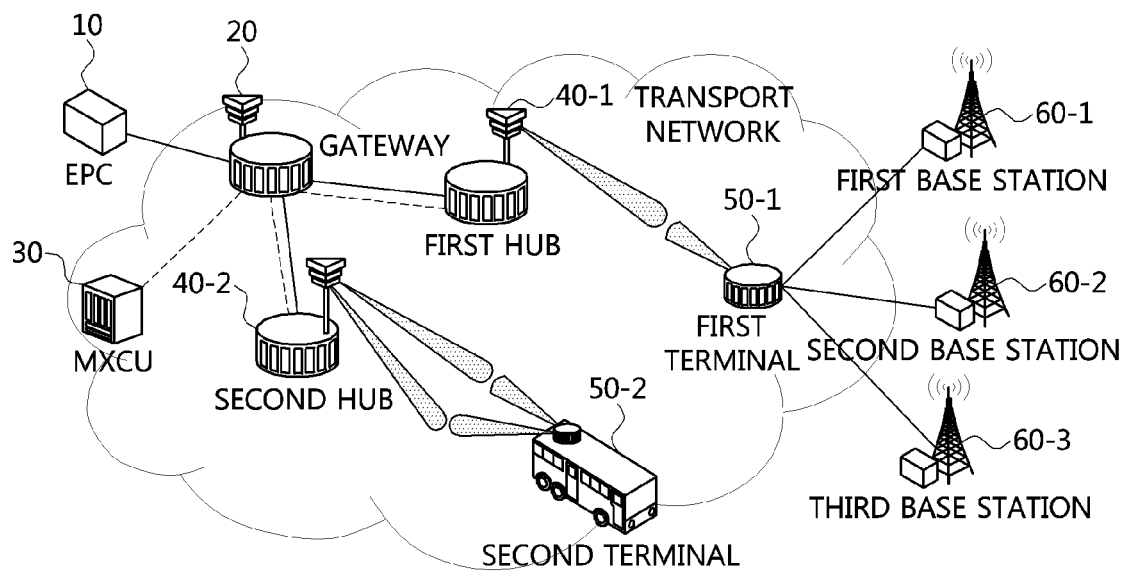
FIG. 2 is a conceptual diagram illustrating a communication network according to an embodiment of the present disclosure.

FIG. 2 is a conceptual diagram illustrating a communication network according to an embodiment of the present disclosure.

Referring to FIG. 2, a communication network according to an embodiment of the present disclosure may mean a transport network supporting communications between an evolved packet core (EPC) 10 performing a core network function and a plurality of base stations. For example, the transport network shown in FIG. 2 may refer to a long term evolution (LTE) based transport network (e.g., a backhaul network) supporting the communications between the EPC 10 and the plurality of base stations.

Here, the plurality of base stations may refer to small base stations each of which supports a small cell. In particular, the plurality of base stations may include a first base station 60-1, a second base station 60-2, and a third base station 60-3. That is, an operation method of a communication node according to an embodiment of the present disclosure may be performed in the transport network supporting the communications between the EPC 10 and the plurality of base stations.

Specifically, the transport network of the present disclosure may include the EPC 10, a gateway 20, a mobility xhaul control unit (MXCU) 30, a first hub 40-1, a second hub 40-2, a first terminal 50-1, a second terminal 50-2, the first base station 60-1, the second base station 60-2, and the third base station 60-3.

Also, each of the EPC 10, the gateway 20, the MXCU 30, the first hub 40-1, the second hub 40-2, the first terminal 50-1, the second terminal 50-2, the first base station 60-1, the second base station 60-2, and the third base station 60-3 may be implemented in a form of the first communication node 100 described in FIG. 1.

Meanwhile, the gateway 20 may mean a packet data network (PDN) gateway (PGW) that performs a function of a fixed switch in the communication network. Specifically, the gateway 20 may support a PDN connection function for the plurality of terminals or an IP anchoring function for mobility.

Such the gateway 20 may be connected to the EPC 10, the MXCU 30, the first hub 40-1, and the second hub 40-2. For example, the gateway 20 may be connected to the EPC 10 via a wired link (denoted by a solid line in FIG. 2) and may be connected to the MXCU 30 via a wireless link (denoted by a dotted line FIG. 2). Also, the gateway 20 may be connected to the first hub 40-1 and the second hub 40-2 via heterogeneous links (a wired link and a wireless link).

Here, the MXCU 30 may perform a function of supporting mobility in the transport network such as that of a mobility management entity (MME) of a LTE system. For example, the MXCU 30 may support mobility of the second terminal 50-2 through the gateway 20 and the second hub 40-2.

Also, each of the first hub 40-1 and the second hub 40-2 included in the transport network of the present disclosure may perform a function of a fixed switch like the gateway 20. However, in the transport network of the present disclosure, each of the first hub 40-1 and the second hub 40-2 may refer to an end hub to which a plurality of terminals may be connected. Specifically, the first hub 40-1 and the second hub 40-2 may perform millimeter-wave-based beamforming and transmit data to a terminal connected thereto based on the beamforming.

Also, the first terminal 50-1 of the plurality of terminals included in the transport network of the present disclosure may be a fixed terminal incapable of supporting mobility. In addition, the first terminal 50-1 may support communications of a plurality of base stations connected to the first terminal 50-1. For example, the first base station 60-1, the second base station 60-2, and the third base station 60-3 included in the plurality of base stations may be connected to the first terminal 50-1. Also, the first terminal 50-1 may be connected to the EPC 10 and the gateway 20 via the first hub 40-1 which is an end hub. In this way, the first terminal 50-1 may support communications of the first base station 60-1, the second base station 60-2, and the third base station 60-3 connected thereto.

Also, the second terminal 50-2 among the plurality of terminals included in the transport network may be a moving terminal capable of supporting mobility. For example, the second terminal 50-1 may be connected to the EPC 10 and the gateway 20 via the second hub 40-2 which is also an end hub. Through such the method, the second hub 40-2 may support communication of the second terminal 50-2.

As described above, the communications between the EPC 10 and the plurality of base stations in the communication network according to an embodiment of the present disclosure may be performed. At this time, the gateway 20 may assign an IP address for packets received from the plurality of base stations or packets transmitted to the plurality of base stations.

For example, the gateway 20 may determine a single IP address for the first base station 60-1, the second base station 60-2, and the third base station 60-3, and assign the determined single IP address to the first terminal 50-1. Thereafter, the first terminal 50-1 may support packet transmissions of the first base station 60-1, the second base station 60-2, and the third base station 60-3 based on the single IP address.

In this case, in the process of supporting packet transmissions of the first base station 60-1, the second base station 60-2, and the third base station 60-3 based on the single IP address assigned from the gateway 20, the first terminal 50-1 may perform IP encapsulation procedures and IP decapsulation procedures on packets to be transmitted based on the single IP address. The IP encapsulation and decapsulation procedures performed in the first terminal 50-1 may cause excessive loads in the process of supporting packet transmissions of the plurality of base stations.

Therefore, instead of assigning a single IP address to the plurality of base stations, a method of assigning a group identity (GID) and a plurality of IP addresses to the plurality of base stations may be proposed in an embodiment according to the present disclosure. Hereinafter, an operation method of a communication node according to an embodiment of the present disclosure will be described in detail with reference to FIGS. 3 to 6.

Figure 3:
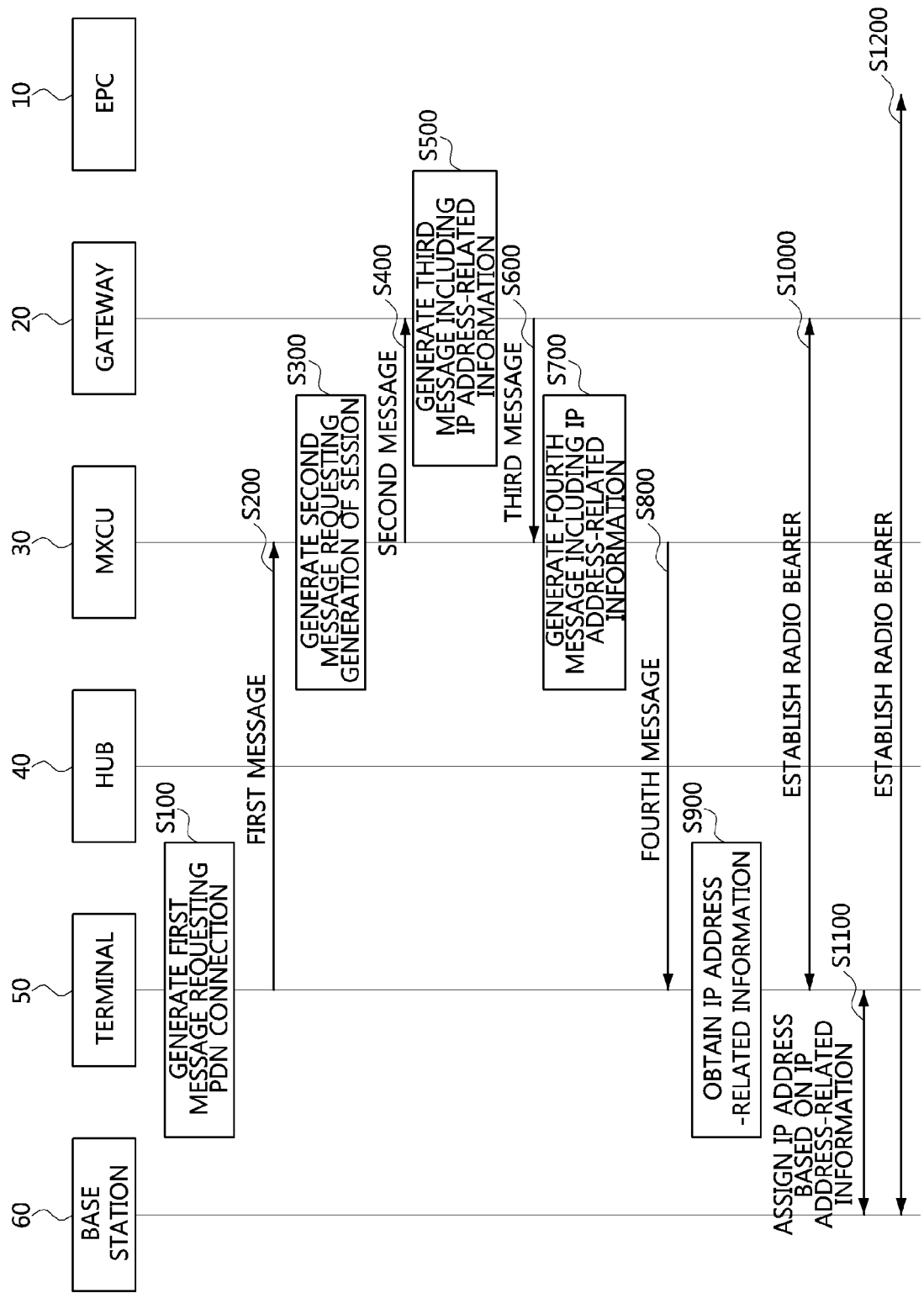
FIG. 3 is a sequence chart illustrating an operation method of a communication node in a communication network according to an embodiment of the present disclosure.

FIG. 3 is a sequence chart illustrating an operation method of a communication node in a communication network according to an embodiment of the present disclosure.

Referring to FIG. 3, an operation method according to an embodiment of the present disclosure may be performed based on an EPC 10, a gateway 20, a MXCU 30, a hub 40, a terminal 50, and a base station 60.

Here, the EPC 10 shown in FIG. 3 may mean the EPC 10 shown in FIG. 2. Also, the gateway 20 shown in FIG. 3 may mean the gateway 20 shown in FIG. 2. That is, the gateway 20 shown in FIG. 3 may be a PDN gateway included in the communication network.

Also, the MXCU 30 shown in FIG. 3 may refer to the MXCU 30 shown in FIG. 2. Also, the hub 40 shown in FIG. 3 may refer to the first hub 40-1 shown in FIG. 2. Also, the terminal 50 shown in FIG. 3 may refer to the first terminal 50-1 shown in FIG. 2. Also, the base station 60 shown in FIG. 3 may refer to one of the plurality of base stations shown in FIG. 2. That is, the base station 60 shown in FIG. 3 may be a small base station supporting a small cell.

First, when a PDN connection is required, the terminal 50 may generate a first message requesting a PDN connection to establish the PDN connection (S100). Here, the first message may include an indicator requesting an international mobile subscriber identity (IMSI) of the terminal 50, information on a PDN type (e.g., information on a type such as IPv4 and IPv6), and a domain name system (DNS) server address.

Thereafter, the terminal 50 may transmit the first message to the MXCU 30 (S200). Specifically, the terminal 50 may transmit the first message to the MXCU 30 in a form of an attach request message which is an evolved packet system (EPS) mobility management (EMM) message.

Meanwhile, the MXCU 30 may receive the first message from the terminal 50. Then, the MXCU 30 may identify the indicator requesting the IMSI of the terminal 50, the information on the PDN type, and the DNS server address.

Thereafter, the MXCU 30 may generate a second message requesting to create a session (S300). Here, the second message may include the indicator identified from the first message, the indicator requesting the IMSI of the terminal 50, the information on the PDN type, and the DNS server address. Here, subscriber information included in the IMSI of the terminal 50 may not include an IP address of the terminal 50. Accordingly, the MXCU 30 may configure a PDN address field included in the second message to '0.0.0.0'. Then, the MXCU 30 may transmit the second message to the gateway 20 (S400).

Accordingly, the gateway 20 may receive the second message from the MXCU 30. Then, the gateway 20 may generate IP address-related information. Here, the IP address-related information may include a GID for a plurality of base stations connected to the terminal 50, a plurality of IP addresses for the plurality of base stations, and a DNS server address. Thereafter, the gateway 20 may generate a third message including the IP address-related information (S500).

For example, the gateway 20 may set the GID for the plurality of base stations connected to the terminal 50 to '1', and generate the plurality of IP addresses (e.g., from '1.1.1.1' to '1.1.1.10') for the plurality of base stations. Then, the gateway 20 may generate the IP address-related information including the GID set to '1' and the plurality of IP addresses (e.g., '1.1.1.1' to '1.1.1.10') for the plurality of base stations. Also, the gateway 20 may generate the IP address-related information so that the IP address-related information further includes a DNS server address in addition to the GID and the plurality of IP addresses generated through the above-described method, and generate the third message including the IP address-related information.

Thereafter, the gateway 20 may transmit the third message to the MXCU 30 in response to the second message received from the MXCU 30 (S600). That is, the third message may refer to a response message indicating the creation of the session. Accordingly, the MXCU 30 may receive the third message including the IP address-related information from the gateway 20. Then, the MXCU 30 may obtain the IP address-related information from the third message. That is, the MXCU 30 may obtain the GID and the plurality of IP addresses for the plurality of base stations and the DNS server address included in the IP address-related information.

Then, the MXCU 30 may generate a fourth message including the IP address-related information based on the obtained GID and plurality of IP addresses, and the obtained DNS server address (S700). Here, the fourth message may further include an indicator for indicating activation of a radio bearer to support communications of the plurality of base stations.

For example, the radio bearer may refer to a default evolved packet system (EPS) bearer. Specifically, the default EPS bearer may include a S5 bearer between the gateway 20 and the hub 40 and a data radio bearer (DRB) between the hub 40 and the terminal 50. Here, the S5 bearer between the gateway 20 and the hub 40 may be configured as a general packet radio service (GPRS) tunneling protocol (GTP) tunnel.

Thereafter, the MXCU 30 may transmit the fourth message to the terminal 50 in response to the first message requesting the PDN connection received from the terminal

50 (S800). Specifically, the MXCU 30 may transmit the fourth message to the terminal 50 in a form of an attach accept message which is an EMM message.

Accordingly, the terminal 50 may receive the fourth message from the MXU 30. Then, the terminal 50 may obtain the IP address-related information from the fourth message (S900). That is, the terminal 50 may obtain the GID, the plurality of IP addresses, and the DNS server address for the plurality of base stations from the IP address-related information. Also, the terminal 50 may obtain the indicator indicating activation of the radio bearer included in the fourth message.

Then, the terminal 50 may establish the radio bearer for supporting communications between the gateway 20 and the base station 60 (S1000). That is, the terminal 50 may establish the radio bearer between the terminal 50 and the gateway 20 to support communications between the gateway 20 and the base station 60. Here, the radio bearer between the terminal 50 and the gateway 20 may refer to the default EPS bearer.

Thus, the terminal 50 may connect to the EPC 10 connected to the gateway 20 based on the established radio bearer. Further, the terminal 50 may support the communication of the base station 60 by connecting to the EPC 10. That is, the terminal 50 may support a function of a backhaul link for the base station 60 by connecting to the EPC 10.

Upon receiving a message requesting assignment of an IP address from the base station 60, the terminal 50 may dynamically assign an IP address to the base station 60 based on the IP address-related information (S1100). Specifically, a method of dynamically assigning an IP address to the base station 60 at the terminal 50 will be described below with reference to FIG. 4.

Figure 4:
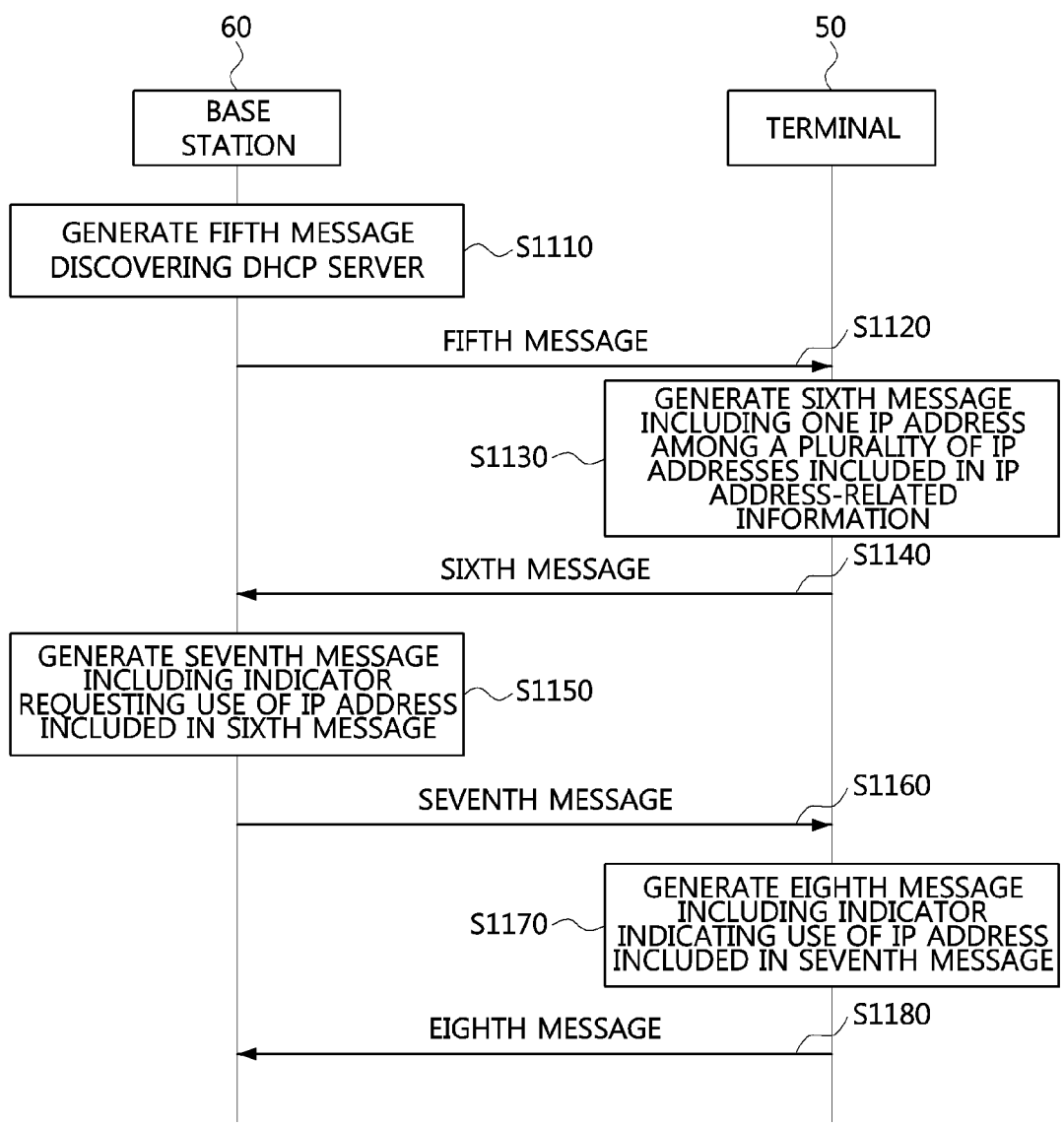
FIG. 4 is a sequence chart illustrating a method of dynamically assigning IP addresses in a communication network according to an embodiment of the present disclosure.

FIG. 4 is a sequence chart illustrating a method of dynamically assigning IP addresses in a communication network according to an embodiment of the present disclosure.

Referring to FIG. 4, in a communication network according to an embodiment of the present disclosure, when a need for assignment of an IP address occurs, the base station 60 may generate a fifth message for discovering a dynamic host configuration protocol (DHCP) server (S1110).

That is, the base station 60 may operate as a DHCP client and may discover a DHCP server existing in the same sub-network with the base station 60. For this purpose, a destination address of a medium access control (MAC) header included in the fifth message may be set to 'FF:FF:FF:FF:FF'. In other words, the fifth message generated at the base station 60 may be a DHCP discover message.

The fifth message may further include an indicator indicating a transmission mode of a response message for the fifth message. Specifically, the fifth message may use a value of a broadcast flag as the indicator indicating a transmission mode of a response message for the fifth message. For example, the value of the broadcast flag included in the fifth message is set to '1', the transmission mode of the response message for the fifth message may be a broadcasting scheme. Also, when the value of the broadcast flag included in the fifth message is set to '0', the transmission mode of the response message for the fifth message may be a unicast scheme.

Thereafter, the base station 60 may transmit the fifth message for discovering a DHCP server based on a broadcasting scheme (S1120). That is, the fifth message may be a broadcast message transmitted in a broadcast manner.

Meanwhile, the terminal 50 may receive the fifth message transmitted in the broadcasting scheme at the base station 60. Then, the terminal 50 may recognize that the base station 60 is searching for a DHCP server by receiving the fifth message. Then, the terminal 50 may determine an IP address of the base station 60 to be one of the plurality of IP addresses included in the IP address-related information.

Thereafter, the terminal 50 may generate a sixth message including the IP address determined as the IP address of the base station 60 among the plurality of IP addresses included in the IP address-related information (S1130). For example, if the plurality of IP addresses included in the IP address-related information are '1.1.1.1' to '1.1.1.10', the terminal 50 may determine the IP address '1.1.1.1' as the IP address for the base station 60.

Here, a destination address of a MAC header included in the sixth message may be set to 'FF:FF:FF:FF:FF'. Also, the sixth message may be a DHCP offer message, which is a response message to the fifth message which is the DHCP discovery message.

Thereafter, the terminal 50 may transmit the sixth message in response to the fifth message (SS140). At this time, the terminal 50 may transmit the sixth message on the basis of one of a broadcasting scheme and a unicast scheme.

For example, the terminal 50 may determine the transmission mode of the sixth message based on the value of the broadcast flag included in the fifth message. Specifically, when the value of the broadcast flag included in the fifth message is set to '1', the terminal 50 may transmit the sixth message based on the broadcasting scheme. On the other hand, when the value of the broadcast flag included in the fifth message is set to '0', the terminal 50 may transmit the sixth message based on the unicast scheme.

Accordingly, the base station 60 may receive the sixth message transmitted from the terminal 50. That is, the base station 60 may recognize that there is the terminal 50, which is a communication node operating as a DHCP server, in the same sub-network by receiving the sixth message transmitted from the terminal 50.

Then, the base station 60 may identify the IP address included in the sixth message. Here, the IP address identified by the base station 60 may be one of the plurality of IP addresses generated by the gateway 20. Then, the base station 60 may generate an indicator for requesting use of the IP address included in the sixth message. Then, the base station 60 may generate a seventh message including the indicator for requesting use of the IP address (S1150). That is, the seventh message may be a DHCP request message requesting use of the IP address, and may further include the IP address and network configuration data including the IP address.

Here, the seventh message may further include an indicator indicating a transmission mode of a response message for the seventh message. Specifically, the seventh message may use a value of a broadcast flag as the indicator indicating a transmission mode of a response message for the seventh message. For example, the value of the broadcast flag included in the seventh message is set to '1', the transmission mode of the response message for the seventh message may be a broadcasting scheme. Also, when the value of the broadcast flag included in the seventh message is set to '0', the transmission mode of the response message for the seventh message may be a unicast scheme.

Thereafter, the base station 60 may transmit the seventh message including the indicator for requesting use of the IP address included in the sixth message to the terminal 50 (S1160). Specifically, the base station 60 may transmit the seventh message based on a broadcasting scheme. That is, the seventh message may be a broadcast message.

Accordingly, the terminal 50 may receive the seventh message transmitted from the base station 60. Then, the terminal 50 may obtain the indicator included in the seventh message, and confirm that the base station 60 is requesting use of one of the plurality of IP addresses included in the IP address-related information.

Then, the terminal 50 may generate an indicator indicating use of the IP address that the base station 60 is requesting to use. Thereafter, the terminal 60 may generate an eighth message including the indicator indicating use of the IP address (S1170). Here, the eighth message may further include the IP address requested by the base station 60 for use. Also, the eighth message may be a DHCP acknowledgement (ACK) message, which is a response message to the seventh message that is the DHCP request message.

Thereafter, the terminal 50 may transmit the eighth message in response to the seventh message (S1180). At this time, the terminal 50 may transmit the eighth message on the basis of one of a broadcasting scheme and a unicast scheme.

For example, the terminal 50 may determine the transmission mode of the eighth message based on the value of the broadcast flag included in the seventh message. Specifically, when the value of the broadcast flag included in the seventh message is set to '1', the terminal 50 may transmit the eighth message based on the broadcasting scheme. On the other hand, when the value of the broadcast flag included in the seventh message is set to '0', the terminal 50 may transmit the eighth message based on the unicast scheme.

As described above, the terminal 50 may dynamically assign the IP address to the base station 60 based on the plurality of IP addresses included in the IP address-related information. Also, the base station 60 may obtain the IP address from the terminal 50 through the above-described process.

Referring again to FIG. 3, the base station 60 may establish a radio bearer for performing communications between the base station 60 and the EPC 10 based on the IP address assigned from the terminal 50 (S1200). Thereafter, the base station 60 may transmit a packet to the EPC 10 or receive a packet from the EPC 10 based on the established radio bearer.

Hereinafter, a method of transmitting and receiving a packet based on an IP address assigned through an operation method of a communication node according to an embodiment of the present disclosure will be described with reference to FIGS. 5 and 6.

Figure 5:
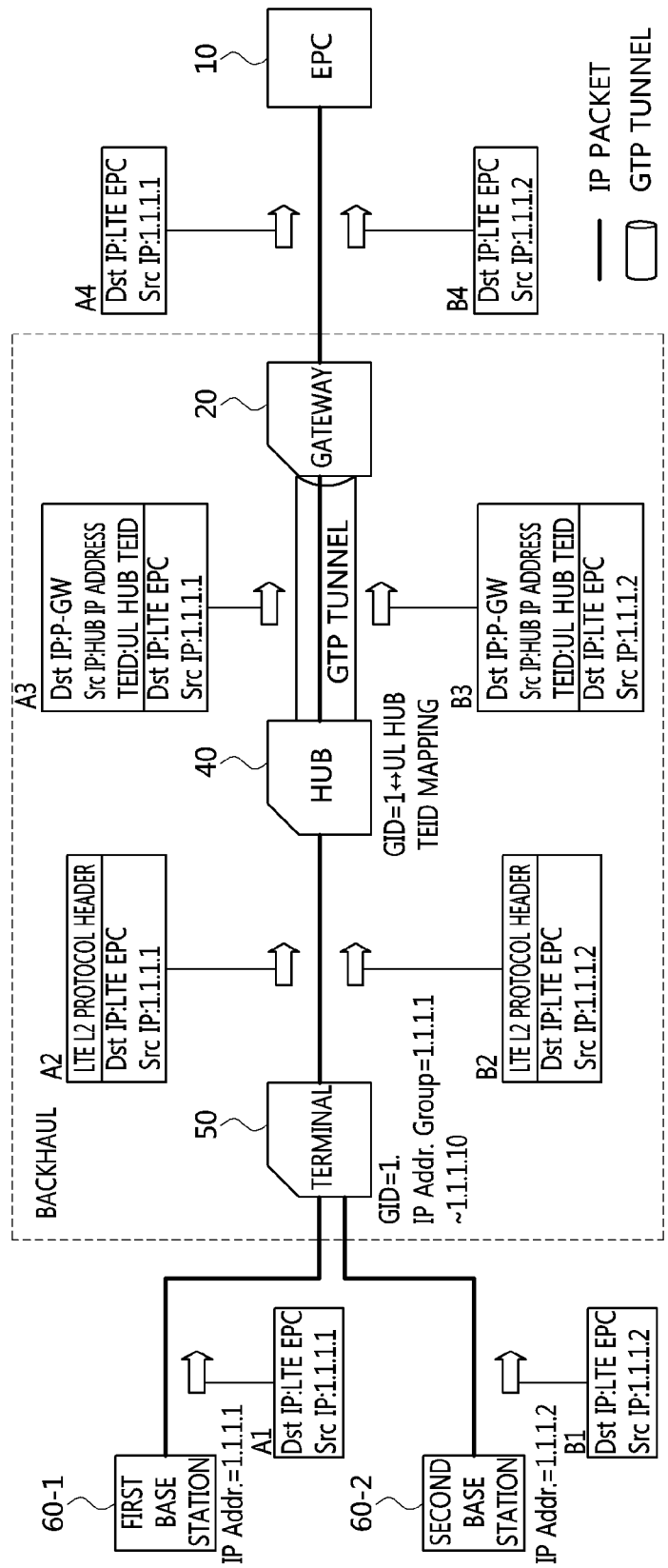
FIG. 5 is a conceptual diagram illustrating a first embodiment of a packet transmission method in a communication network according to an embodiment of the present disclosure.

FIG. 5 is a conceptual diagram illustrating a first embodiment of a packet transmission method in a communication network according to an embodiment of the present disclosure.

Referring to FIG. 5, the first base station 60-1 and the second base station 60-2 included in the plurality of base stations in the communication network according to an embodiment of the present disclosure may transmit packets to the EPC 10 based on the IP addresses dynamically pre-assigned by the terminal 50.

Here, it may be assumed that the IP addresses are assigned to the first base station 60-1 and the second base station 60-2 by the terminal 50 through the operation method described with reference to FIGS. 3 and 4. Also, it may be assumed that the terminal 50 may have the GID and the plurality of IP addresses for the plurality of base stations which are assigned by the MXCU 30 and the gateway 20 based on the operation method described referring to FIGS. 3 and 4.

Specifically, it may be assumed that the IP address assigned to the first base station 60-1 is '1.1.1.1' and the IP address assigned to the second base station 60-2 is '1.1.1.2'.

Also, the GID assigned to the terminal 50 may be assumed to be '1', and the plurality of IP addresses may be assumed to be '1.1.1.1' to '1.1.1.10'.

First, the first base station 60-1 may transmit a first packet to the terminal 50. Also, the second base station 60-2 may transmit a second packet to the terminal 50. Here, a source address of the first packet transmitted from the first base station 60-1 may be '1.1.1.1', and a source address of the second packet transmitted from the second base station 60-2 may be '1.1.1.2'. Here, a packet format of the first packet may be represented as A1 shown in FIG. 5, and a packet format of the second packet may be represented as B1 shown in FIG. 5.

Accordingly, the terminal 50 may receive the first packet from the first base station 60-1. Also, the terminal 50 may receive the second packet from the second base station 60-2. The terminal 50 may then transmit the first packet and the second packet via the radio bearer established between the terminal 50 and the gateway 20. Here, the radio bearer established between the terminal 50 and the gateway 20 may be the default EPS bearer.

Specifically, the terminal 50 may transmit the first packet and the second packet to the hub 40 via a DRB, which is a radio bearer between the terminal 50 and the hub 40. At this time, the terminal 50 may not perform an IP encapsulation procedure on the first packet and the second packet by transmitting the first packet and the second packet based on a layer-2 (L2) protocol (e.g., LTE L2 protocol). Accordingly, each of the first packet and the second packet transmitted from the terminal 50 to the hub 40 may further include an L2 protocol header. Here, a packet format of the first packet may be represented as A2 shown in FIG. 5, and a packet format of the second packet may be represented as B2 shown in FIG. 5.

Meanwhile, the hub 40 may receive the first packet and the second packet by performing a reassembly based on the L2 protocol header included in the first packet and the second packet transmitted from the terminal 50. The hub 40 may then transmit the first packet and the second packet to the gateway 20 via a GTP tunnel, which is a S5 bearer between the hub 40 and the gateway 20.

Here, the GTP tunnel which is the S5 bearer between the hub 40 and the gateway 20 may be established in the process of establishing the default EPS bearer which is the radio bearer between the terminal 50 and the gateway 20. Also, the GTP tunnel between the hub 40 and the gateway 20 may be mapped to a tunnel ID (TEID) in the process of establishing the default EPS bearer.

Specifically, the hub 40 may recognize that the first packet and the second packet are packets generated by the terminal 50 whose GID is set to '1' through the source address of the first packet and the source address of the second packet. The hub 40 may then map the first packet and the second packet to the GTP tunnel of the hub, which is responsible for uplink for the first packet and the second packet. Here, each of the first packet and the second packet may further include a GTP protocol header (e.g., a destination address, a source address, and a TEID). Here, a packet format of the first packet may be represented as A3 shown in FIG. 5, and a packet format of the second packet may be shown as B3 shown in FIG. 5.

Meanwhile, the gateway 20 may receive the first packet and the second packet transmitted from the hub 40 through the GTP tunnel. Thereafter, the gateway 20 may remove the GTP protocol header included in each of the first packet and the second packet, and may transmit the first packet and the second packet from which the GTP protocol header is removed to the EPC 10. Here, a packet format of the first packet from which the GTP protocol header is removed may be represented as A4 shown in FIG. 5, and a packet format of the second packet from which the GTP protocol header is removed may be represented as B4 shown in FIG. 5.

Therefore, the packet format A1 which is the packet format of the first packet transmitted from the first base station 60-1 may be the same as the packet format A4 which is the packet format of the first packet received from the EPC 10. Also, the packet format B1 which is the packet format of the second packet transmitted from the second base station 60-2 may be the same as the packet format B4 which is the packet format of the second packet received from the EPC 10.

Figure 6:
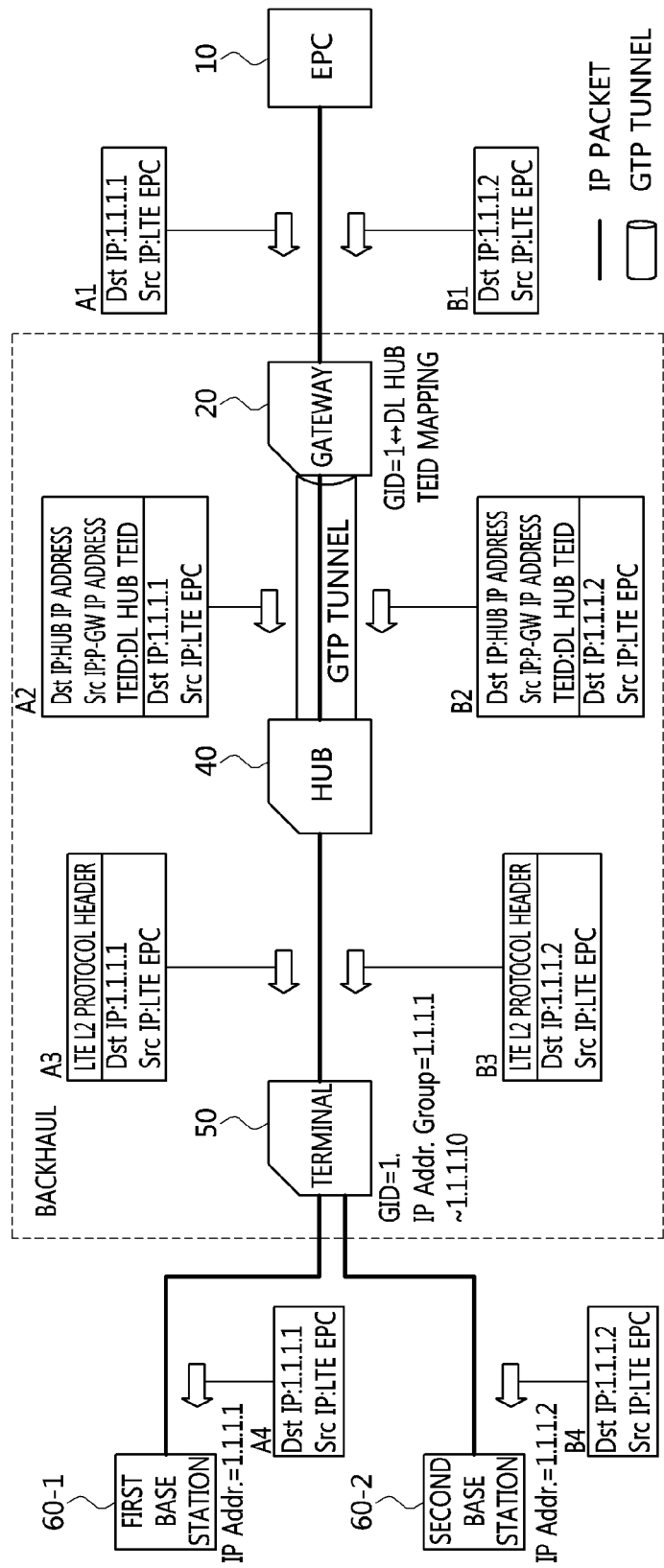
FIG. 6 is a conceptual diagram illustrating a second embodiment of a packet transmission method in a communication network according to an embodiment of the present disclosure.

FIG. 6 is a conceptual diagram illustrating a second embodiment of a packet transmission method in a communication network according to an embodiment of the present disclosure.

Referring to FIG. 6, in a communication network according to an embodiment of the present disclosure, the EPC 10 may transmit packets to the first base station 60-1 and the second base station 60-2 among the plurality of base stations based on the GID preassigned by the gateway 20 and the IP address dynamically preassigned by the terminal 50.

Here, the first base station 60-1 and the second base station 60-2 may be assumed to have the IP address assigned by the terminal 50 based on the operation method according to the present disclosure described with reference to FIGS. 3 and 4. Also, the terminal 50 may be assumed to have the GID and the plurality of IP addresses which are assigned by the MXCU 30 and the gateway 20 based on the operation method according to the present disclosure with reference to FIGS. 3 and 4.

Specifically, it may be assumed that the IP address assigned to the first base station 60-1 is '1.1.1.1' and the IP address assigned to the second base station 60-2 is '1.1.1.2'. Also, the GID ID assigned to the terminal 50 may be assumed to be '1', and the plurality of IP addresses may be assumed to be '1.1.1.1' to '1.1.1.10'.

First, the EPC 10 may transmit a first packet destined for the first base station 60-1 and a second packet destined for the second base station 60-2 to the gateway 20. Here, a destination address of the first packet destined for the first base station 60-1 may be set to '1.1.1.1', and a destination address of the second packet destined for the second base station 60-2 may be set to '1.1.1.2'. Here, a packet format of the first packet may be represented as A1 shown in FIG. 6, and a packet format of the second packet may be represented as B1 shown in FIG. 6.

Accordingly, the gateway 20 may receive the first packet and the second packet from the EPC 10. The gateway 20 may then transmit the first packet and the second packet to the hub 40 via the GTP tunnel which is the S5 bearer between the gateway 20 and the hub 40. Here, the GTP tunnel between the gateway 20 and the hub 40 may be established in the process of establishing the default EPS bearer which is the radio bearer between the gateway 20 and the terminal 50. Also, the GTP tunnel between the gateway 20 and the hub 40 may be mapped to the TEID in the process of establishing the default EPS bearer.

Specifically, the gateway 20 may recognize that the first packet and the second packet are packets destined for the terminal 50 whose GID is set to '1' through the destination address of the first packet and the destination address of the second packet. Thereafter, the gateway 20 may map the first packet and the second packet to the GTP tunnel of the hub, which is responsible for downlink for the first and second packets. Here, each of the first packet and the second packet may further include a GTP protocol header. Here, a packet format of the first packet can be represented as A2 shown in FIG. 6, and a packet format of the second packet can be represented as B2 shown in FIG. 6.

Meanwhile, the hub 40 may remove the GTP protocol header included in each of the first packet and the second packet transmitted from the gateway 20, and transmit the first packet and the second packet from which the GTP protocol header is removed to the terminal 50. The hub 40 may then transmit the first packet and the second packet to the terminal 50 via the DRB which is a radio bearer between the hub 40 and the terminal 50. Specifically, the hub 40 may transmit the first packet and the second packet based on the L2 protocol procedure. Accordingly, each of the first packet and the second packet transmitted from the hub 40 to the terminal 50 may further include an L2 protocol header. Here, a packet format of the first packet may be represented as A3 shown in FIG. 6, and a packet format of the second packet may be shown as B3 shown in FIG. 6.

Meanwhile, the terminal 50 may receive the first packet and the second packet by performing a reassembly based on the L2 protocol header included in the first packet and the second packet transmitted from the hub 40. Then, the terminal 50 may transmit the first packet to the first base station 60-1 based on the destination address of the first packet set to '1.1.1.1'. Also, the terminal 50 may transmit the second packet to the second base station 60-2 based on the destination address of the second packet set to '1.1.1.2'.

Therefore, the packet format A1 of the first packet transmitted from the EPC 10 and the packet format A4 of the first packet received from the first base station 60-1 may be the same. Also, the packet format B1 of the second packet transmitted from the EPC 10 and the packet format B4 of the second packet received by the second base station 60-2 may be the same.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first communication node in a communication system including an evolved packet core (EPC), a plurality of base stations, and a communication network connecting the EPC and the plurality of base stations, the operation method comprising:

transmitting a first message requesting a packet data network (PDN) connection to a second communication node included in the communication network;
receiving a second message including an internet protocol (IP) address-related information which includes a plurality of IP addresses and a group identity (GID) indicating a group of the plurality of IP addresses from the second communication node;
and
dynamically assigning the plurality of IP addresses, included in the group which is indicated by the GID, to each of the plurality of base stations,
wherein the GID indicates the group of the plurality of IP addresses which is assigned to each of the plurality of base stations connected to the first communication node.

2. The operation method according to claim 1, wherein the first communication node is a terminal included in the communication network, and the second communication node is a communication node controlling mobility of the communication network.

3. The operation method according to claim 1, wherein the first message includes an indicator requesting an international mobile subscriber identity (IMSI) of the first communication node, information on a PDN type, and a domain name system (DNS) server address.

4. The operation method according to claim 1, wherein the IP address-related information includes a DNS server address for the plurality of base stations connected to the first communication node.

5. The operation method according to claim 1, wherein the IP address-related information is generated in a PDN gateway connected to the second communication node.

6. The operation method according to claim 1, wherein the plurality of base stations are small base stations each of which supports a small cell.

7. The operation method according to claim 1, wherein the dynamically assigning IP addresses includes:
receiving a third message for discovering a dynamic host configuration protocol (DHCP) server from a first base station among the plurality of base stations; and
transmitting a fourth message including one of a plurality of IP addresses included in the IP address-related information to the first base station.

8. The operation method according to claim 7, wherein the dynamically assigning IP addresses includes:
receiving a fifth message including an indicator requesting use of the one of a plurality of IP addresses from the first base station; and
transmitting a sixth message including an indicator indicating the use of the one of a plurality of IP addresses to the first base station.

9. An operation method of a first communication node in a communication system including an evolved packet core (EPC), a plurality of base stations, and a communication network connecting the EPC and the plurality of base stations, the operation method comprising:
receiving a first message requesting creation of a session from a second communication node included in the communication network;
generating an internet protocol (IP) address-related information including a plurality of IP addresses for the plurality of base stations included in the communication network and first group identity (GID) indicating a first group to which the plurality of IP addresses belongs;
transmitting a second message including the IP address-related information to the second communication node;
establishing a radio bearer for supporting communications between the first communication node and the plurality of base stations; and
supporting communications of the plurality of base stations based on the established radio bearer,
wherein the first GID indicates the first group of the plurality of IP addresses which are assigned to each of the plurality of base stations connected to one terminal, and the first GID is configured to be different from a second GID which is assigned to another terminal.

10. The operation method according to claim 9, wherein the first communication node is a packet data network (PDN) gateway included in the communication network, the second communication node is a communication node controlling mobility of the communication network, and the plurality of base stations are small base stations each of which supports a small cell.

11. The operation method according to claim 9, wherein the first message includes an indicator requesting an international mobile subscriber identity (IMSI) of each of the one terminal and the another terminal, information on a PDN type, and a domain name system (DNS) server address.

12. The operation method according to claim 9, wherein the IP address-related information includes a DNS server address for the plurality of base stations.

13. The operation method according to claim 9, wherein the radio bearer is a default evolved packet system (EPS) bearer for supporting communications between the first communication node and the plurality of base stations.

14. A first communication node in a communication system including an evolved packet core (EPC), a plurality of base stations, and a communication network connecting the EPC and the plurality of base stations, the first communication node comprising a processor and a memory storing at least one instruction executed by the processor, wherein the at least one instruction is configured to:
receive a first message requesting a packet data network (PDN) connection from a second communication node, among a plurality of second communication nodes included in the communication network;
transmit a second message requesting creation of a session to a third communication node included in the communication network;
receive, from the third communication node, a third message including an internet protocol (IP) address-related information for the plurality of base stations included in the communication network; and
transmit a fourth message including the IP address-related information to each of the second communication nodes,
wherein the IP address-related information includes a plurality of IP addresses for the plurality of base stations included in the communication network and a first group identity (GID) indicating a first group to which the plurality of IP addresses belongs,
wherein the first GID indicates the first group of the plurality of IP addresses which are assigned to each of the plurality of base stations connected to one of the second communication nodes, and the first GID is configured to be different from a second GID which is assigned to another of the second communication nodes.

15. The first communication node according to 14, wherein the first communication node is a communication node controlling mobility of the communication network, and the second communication node is a terminal included in the communication network.

16. The first communication node according to 14, wherein the third communication node is a PDN gateway included in the communication network.

17. The first communication node according to 14, wherein the plurality of base station are small base stations each of which supports a small cell.

18. The first communication node according to 14, wherein the first message includes an indicator requesting an international mobile subscriber identity (IMSI) of the second communication node, information on a PDN type, and a domain name system (DNS) server address.

19. The first communication node according to 14, wherein the IP address-related information includes a DNS server address for the plurality of base stations.

* * * * *